US011364697B1

(12) United States Patent
Kelley

(10) Patent No.: US 11,364,697 B1
(45) Date of Patent: Jun. 21, 2022

(54) METHODS OF MANUFACTURING FIBER OPTIC PLATES FOR ELECTRONIC DEVICES

(71) Applicant: Apple Inc., Cupertino, CA (US)

(72) Inventor: Paul C. Kelley, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 237 days.

(21) Appl. No.: 16/803,161

(22) Filed: Feb. 27, 2020

Related U.S. Application Data

(60) Provisional application No. 62/847,823, filed on May 14, 2019.

(51) Int. Cl.
 *B29D 11/00* (2006.01)
 *G02B 6/08* (2006.01)
(52) U.S. Cl.
 CPC .. *B29D 11/00663* (2013.01); *B29D 11/00673* (2013.01); *G02B 6/08* (2013.01)
(58) Field of Classification Search
 CPC ........ B29D 11/00663; B29D 11/00673; G02B 6/08
 See application file for complete search history.

(56) References Cited

U.S. PATENT DOCUMENTS

| | | | |
|---|---|---|---|
| 5,935,288 A | 8/1999 | DiGiovanni et al. | |
| 5,938,812 A | 8/1999 | Hilton, Sr. | |
| 5,978,536 A | 11/1999 | Brandi et al. | |
| 7,807,094 B2 | 10/2010 | Kim et al. | |
| 2006/0045444 A1 | 3/2006 | Miller et al. | |
| 2008/0209952 A1 | 9/2008 | Tremblay | |
| 2018/0128973 A1* | 5/2018 | Powell | H01L 51/5275 |
| 2020/0348465 A1* | 11/2020 | Niwa | G02F 1/13336 |

* cited by examiner

*Primary Examiner* — Mathieu D Vargot
(74) *Attorney, Agent, or Firm* — Treyz Law Group, P.C.; G. Victor Treyz; Joseph F. Guihan

(57) ABSTRACT

An electronic device may have a housing with a display. A protective display cover layer for the display may have an image transport layer such as a fiber optic plate. The fiber optic plate may be formed from a bundle of fibers. The fibers may be formed using fiber extruding equipment. Each fiber may have a core covered with a cladding, a stray light absorbing layer, and binder material. The fibers may be deformed in a heated chamber by pressing inwardly with a die that has a recess, causing the fibers to bulge into the recess. A cutter can be used to cut off a layer of the deformed fibers. This layer may be machined and polished to form the fiber optic plate.

21 Claims, 7 Drawing Sheets

METHODS OF MANUFACTURING FIBER OPTIC PLATES FOR ELECTRONIC DEVICES

This application claims the benefit of provisional patent application No. 62/847,823, filed May 14, 2019, which is hereby incorporated by reference herein in its entirety.

FIELD

This relates generally to electronic devices, and, more particularly, to display cover layers for electronic devices.

BACKGROUND

Electronic devices may have displays. Displays have arrays of pixels for displaying images for a user. To prevent damage to the pixels, the pixels can be covered with a transparent display cover layer. If care is not taken, however, the inclusion of a display cover layer into an electronic device may cause the device to have larger inactive border regions than desired or may introduce undesired image distortion.

SUMMARY

An electronic device may have a housing. A display may be mounted in the housing. A protective display cover layer may be formed over the display. During operation, images on the display may be viewed through the protective display cover layer.

The protective display cover layer may have an image transport layer such as a fiber optic plate. The fiber optic plate may guide and expand image light from the display and thereby expand the effective size of images on the display. The expanded image size helps cover peripheral housing structures and minimizes the size of display borders.

The fiber optic plate may be formed from a bundle of fibers. The fibers may be formed using an extruder. Each fiber may have a core covered with a cladding, a stray light absorbing layer, and binder material. A loose bundle of the fibers may be processed in a heated chamber.

The fibers may be deformed in the heated chamber by pressing inwardly with a die that has a recess. This causes the fibers to bulge into the recess. The binder holds the fibers together. A cutter can be used to cut off a layer of the deformed fibers. This layer may be machined into a desired shape such as a shape with rounded edge profiles. A polishing tool may polish the fibers to form a fiber optic plate for the protective display cover layer. The protective display cover layer, a display, and other components may be assembled into a housing to form an electronic device.

DETAILED DESCRIPTION

An electronic device may have a display. The display may have an array of pixels for creating an image. The image may pass through a protective display cover layer that overlaps the array of pixels. To minimize display borders, the display cover layer may include an image transport layer formed from a coherent fiber bundle or Anderson localization material. The image transport layer helps expand the effective size of the image without imparting undesired distortion to the image. In an illustrative configuration, which may sometimes be described herein as an example, a display cover layer for the display in an electronic device is formed from a fiber optic plate that contains a deformed coherent fiber bundle.

Figure 1:
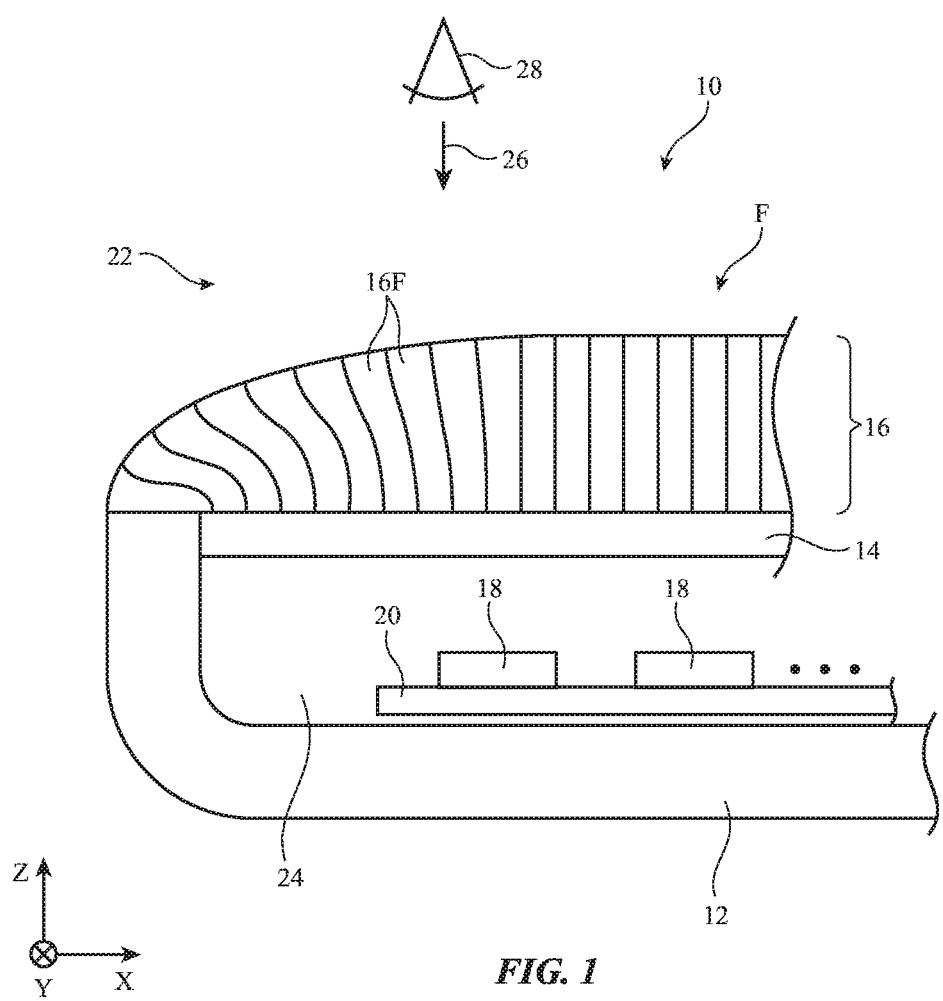
FIG. 1 is a side view of an illustrative electronic device with a fiber optic plate in accordance with an embodiment.

A cross-sectional side view of a portion of an illustrative electronic device with a display cover layer that includes a fiber optic plate is shown in FIG. 1. In the example of FIG. 1, device 10 is a portable device such as a cellular telephone, wristwatch, or tablet computer. Other types of devices may have display cover layers with fiber optic plates, if desired.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output. Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may be sufficiently flexible to be bent. Displays for device 10 may have pixel arrays for displaying images for a user. Each pixel array (which may sometimes be referred to as a display panel, display substrate, or display) may be mounted under a transparent display cover layer that helps to protect the pixel array. In the example of FIG. 1, pixel array (display) 14 is mounted under an image transport layer such as fiber optic plate 16, which serves as a protective display cover layer (and which may sometimes be referred to as forming a transparent portion of the housing for device 10). Additional protective layers (e.g., transparent layers of glass, crystalline material such as sapphire, etc.) may be stacked above and/or below fiber optic plate 16. The configuration of FIG. 1 in which the display cover layer for device 10 is formed from fiber optic plate 16 is illustrative.

During operation, the pixels of display 14 produce image light that passes through optical fibers 16F in fiber optic plate 16 for viewing by a user such as viewer 28 who is viewing device 10 in direction 26. The fibers or other optical structures of image transport layer structures such as fiber optic plate 16 (which may sometimes be referred to as a coherent fiber bundle) transport light (e.g., image light and/or other light) from one surface (e.g., the surface of plate 16 facing display 14) to another (e.g., the surface of plate 16 facing viewer 28) while preserving the integrity of the image light or other light. This allows an image produced by an array of pixels in a flat or curved display to be transferred from an input surface of a first shape at a first location to an output surface with a curved cross-sectional profile, compound curvature, or other desired second shape at a second location. The fiber optic plate may therefore move the location of an image and may optionally change the shape of the surface on which the image is presented.

Device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the rectangular periphery of plate 16 may be deformed outwardly as shown in FIG. 1. The deformed shapes of fibers 16F help distribute image light laterally outwards in the X-Y plane so that the effective size of display 14 is enlarged and the image produced by display 14 covers some or all of the sidewalls of housing 12 when the image on front face F is being viewed by viewer 28. For example, the bent shapes of fibers 16F may help shift portion of the displayed image laterally outward in the X-Y plane along the edges and corners of device 10 to block the sidewall portions of housing 12 from view. In some arrangements, the portions of fibers 16F at the outermost surface of layer 16 are oriented parallel or nearly parallel with viewing direction 26 and the Z axis of FIG. 1, which helps ensure that some or all of the light that has passed through plate 16 will travel in the Z direction and be viewable by viewer 28.

Figure 2:
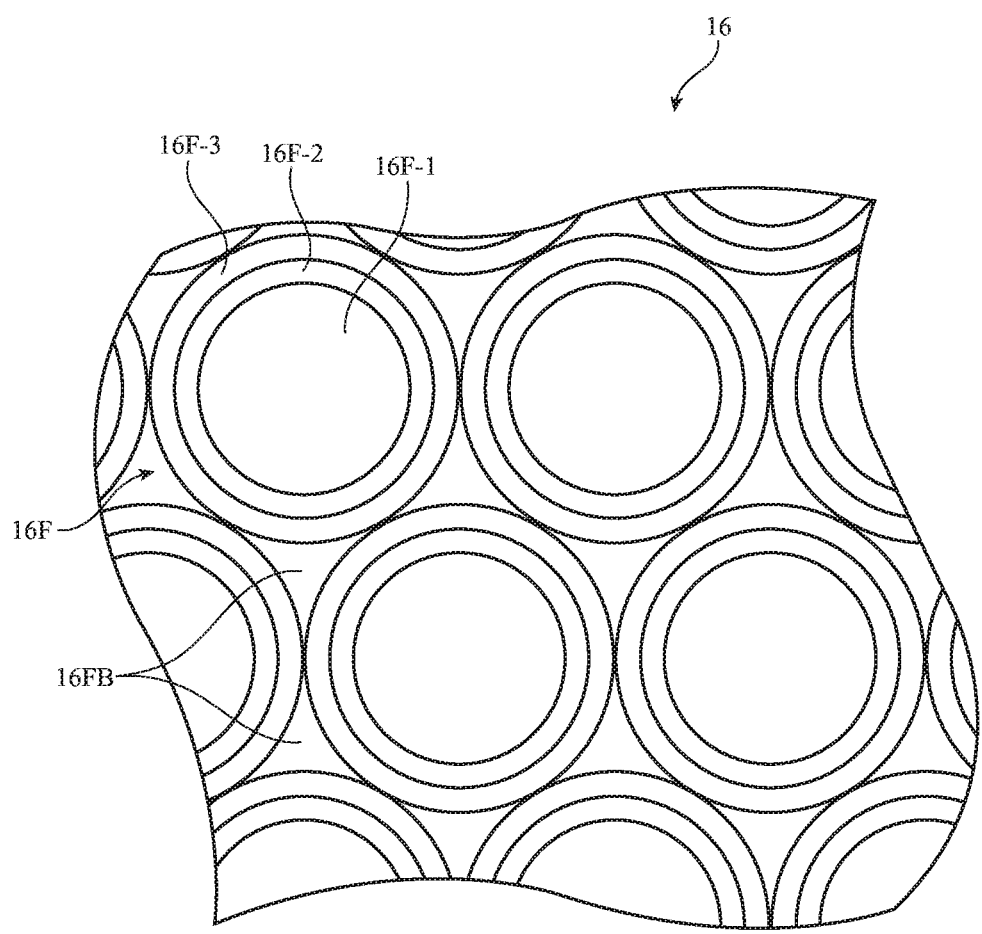
FIG. 2 is a cross-sectional view of a portion of a fiber-optic plate in accordance with an embodiment.

Fibers 16F for fiber optic plate 16 may have any suitable configuration. A cross-sectional view of fiber optic plate 16 in an illustrative arrangement in which fibers 16F have multiple layers of material is shown in FIG. 2. As shown in FIG. 2, fibers 16F may each have a core such as core 16F-1. Cores 16F-1 and the other structures of fiber optic plate 16 may be formed from transparent materials such as polymer, glass, crystalline material such as sapphire, and/or other transparent materials. In an illustrative configuration, which may sometimes be described herein as an example, fiber optical plate 16 includes polymer fibers.

Fiber cores 16F-1 may be formed from polymer of a first refractive index and may be surrounded by cladding 16F-2 (e.g., polymer) of a second, lower refractive index. This arrangement allows fibers 16F to guide light in accordance with the principal of total internal reflection. In some configurations, a stray light absorbing layer such as layer 16F-3 may be applied as a coating on cladding 16F-2 to help absorb stray light. Core 16F-1 and cladding 16F-2 may be formed from clear polymers. Stray light absorbing layer 16F-3 may contain black pigment or other light absorbing material that renders layers 16F-3 opaque (e.g., layer 16F-3 may be formed from a material that absorbs and blocks light). Binder material 16FB (e.g., clear polymer) may hold fibers 16F together to form plate 16. The fractional cross-sectional areas occupied by core 16F-1, cladding 16F-2, stray light absorbing layer 16F-3, and binder 16FB may respectively be 65%-85%, 2-10%, 1-5%, and 5-15%, and/or other suitable values.

The diameter of core 16F-1 may be 5-15 microns or other suitable size (e.g., at least 3 microns, at least 7 microns, 10 microns, at least 15 microns, less than 20 microns, less than 14 microns, etc.). The thickness of cladding 16F-2 may be 0.5 microns, at least 0.1 microns, at least 0.4 microns, less than 2 microns, less than 0.9 microns, or other suitable thickness. The thickness of stray light absorbing layer 16F-3 may be 0.1 microns, at least 0.01 microns, at least 0.05 microns, less than 2.5 microns, less than 0.4 microns, less than 0.15 microns, or other suitable thickness. If desired, fibers 16F may contain more layers, fewer layers, layers arranged in different orders, and/or may have other configurations.

Figure 3:
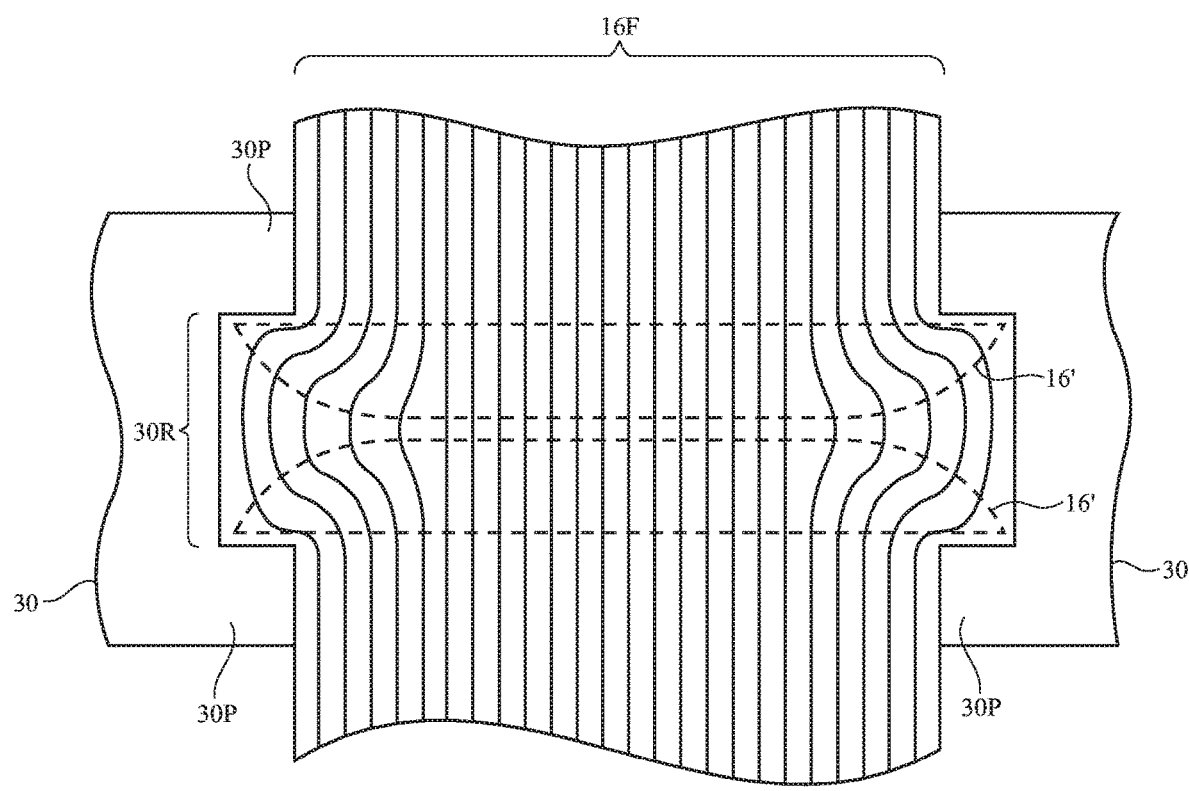
FIG. 3 is a cross-sectional side view of illustrative equipment for deforming fibers into a desired shape in accordance with an embodiment.

FIG. 3 shows how a collection of fibers 16F may be deformed under heat and pressure using heated molding structures (a heated mold) such as die 30. Die 30 may have multiple portions that are joined inwardly to press against fibers 16F. Die 30 may have a recessed portion (see, e.g., recess 30R) located between protruding portions 30P. Recess 30R may have a rectangular cross-sectional profile or other suitable shape. When die 30 presses inwardly on fibers 16F, protruding portions 30P push against fibers 16F and cause fibers 16F to bow outwardly and bulge into recess 30R. During deformation operations, fibers 16F may be heated to a temperature sufficient to soften fibers 16F without melting fibers 16F (e.g., a temperature of 150° C. or other suitable temperature sufficient to soften fibers 16F). After the deformed fibers are cooled, the deformed fibers will solidify and become rigid. Plates 16 may then be formed that have desired shapes such as the illustrative plate shapes shown by dashed lines 16' of FIG. 3.

Figure 4:
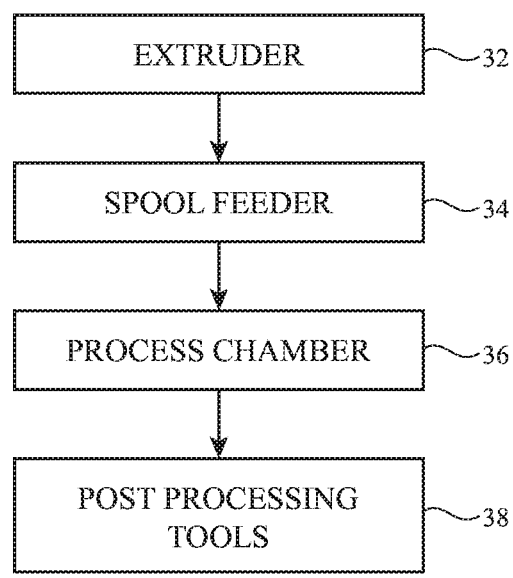
FIG. 4 is a diagram showing illustrative equipment that may be used for forming a fiber optic plate in accordance with an embodiment.

FIG. 4 is a diagram of illustrative fabrication equipment that may be used in forming fiber optic plate 16. As shown in FIG. 4, the fabrication equipment may include equipment for forming fibers 16F (e.g., fiber forming equipment) such as extruder 32. Extruder 32 may produce spools of fibers. The fibers on the spools may include single-strand fibers and/or bundles that contain hundreds of fibers (as an example).

Spooled fiber may be supplied to process chamber 36 using spool feeder 34. Process chamber 36 may have a guide plate with hundreds or thousands of holes for fibers 16F (single fibers and/or bundles of fibers 16F) from spool feeder 34. The guide plate may, as an example, have a first side that receives about 10 million fibers 16F and may guide these fibers into a loose fiber bundle that exits an opposing second side for further processing using die 30 (FIG. 3). The loose fiber bundle that exits the second may laterally cover an area approximately equal to the desired area of the fiber optic plate being formed. Fibers 16F may be deformed by a mold in process chamber 36.

Following formation of fiber optic plate structures in process chamber 36, post processing tools 38 may be used to form finished fiber optic plates 16. Tools 38 may include, for example, equipment to create desired surface shapes for the surfaces of each fiber optic plate 16 (e.g., machining equipment such as a grinding tool for forming curved edge profiles in the plate, saws or other cutting tools, polishing equipment for polishing the surfaces of each fiber optic plate 16, etc.).

Figure 5A:
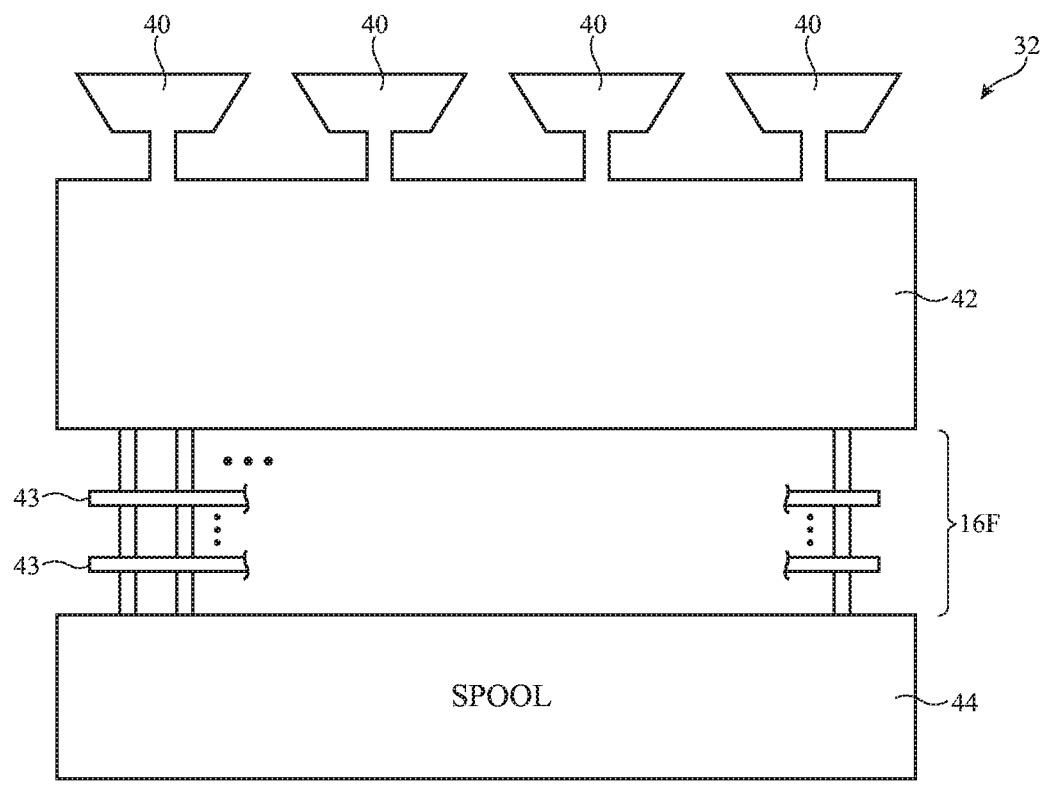
FIG. 5A is a side view illustrative extruder in accordance with an embodiment.

FIG. 5A is a diagram of an illustrative extruder. As shown in FIG. 5A, extruder 32 may have hoppers 40 that contain material (e.g., polymers) for the different portions of plate 16. A first of hoppers 40 may, for example, include a clear polymer of a first refractive index for forming core 16F-1. A second of hoppers 40 may include a clear polymer of a second refractive index that is lower than the first refractive index. The polymer in the second hopper may be used in forming cladding 16F-2. A third of hoppers 40 may include a polymer (e.g., a black light-absorbing polymer) for forming stray light absorbing layer 16F-3. A fourth of hoppers 40 may include a polymer for forming binder 16FB. The different polymers in hoppers 40 may be heated to soften and/or liquefy these polymers so that these different polymers may be extruded through extrusion head 42 (e.g., a spin-pack die) to form fibers 16F. One or more spools such as spool 44 may collect the extruded fibers 16F.

Figure 5B:
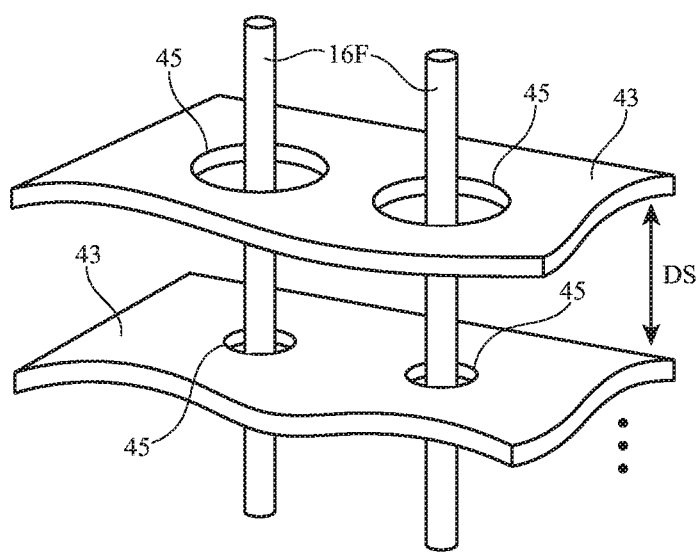
FIG. 5B is a perspective view of illustrative guide plates for the extruder of FIG. 5A in accordance with an embodiment.

As shown in FIG. 5A, extruder 32 may have a series of parallel plates such as guide plates 43 to help prevent extruded fibers 16F from becoming misaligned. Each of plates 43 may have a respective hole for each fiber 16F being produced by the extruder, as shown by holes 45 in plates 43 of FIG. 5B. Holes 45 may have any suitable shapes and sizes. As an example, holes 45 may be circular and each plate 43 may contain holes 45 of a common diameter. Appropriate hole size and appropriate separations between plates 43 may be determined by measuring the amount of travel fibers 16F would experience in the absence of plates 43. With an illustrative configuration, plate-to-plate separation DS and the separation between the uppermost of plates 43 and the bottom of head 42 may be about 1 cm, at least 0.1 cm, less than 10 cm, less than 1 cm, or other suitable distance and the diameter of holes 45 may decrease from plate to plate as a function of increasing distance from head 42. There may be any suitable number of plates 43 (e.g., at least two, at least three, fewer than five, fewer than three, 2-4, 2-3, etc.). In an illustrative arrangement with two of plates 43, the uppermost of plates 43 adjacent to head 42 may have holes 45 of a first diameter (e.g., 25 mm, at least 5 mm, less than 125 mm, etc.) and the lowermost of plates 43 may have holes of a second diameter that is smaller than the first diameter (e.g., 15 mm, at least 3 mm, less than 75 mm, etc.). Using fiber guide structures between head 42 and spool 44 may help maintain fiber order and alignment and may therefore help ensure fiber parallelism and coherence in plate 16, ensuring that the image produced at the exit surface of plate 16 will be satisfactory for viewing by the user.

Figure 6:
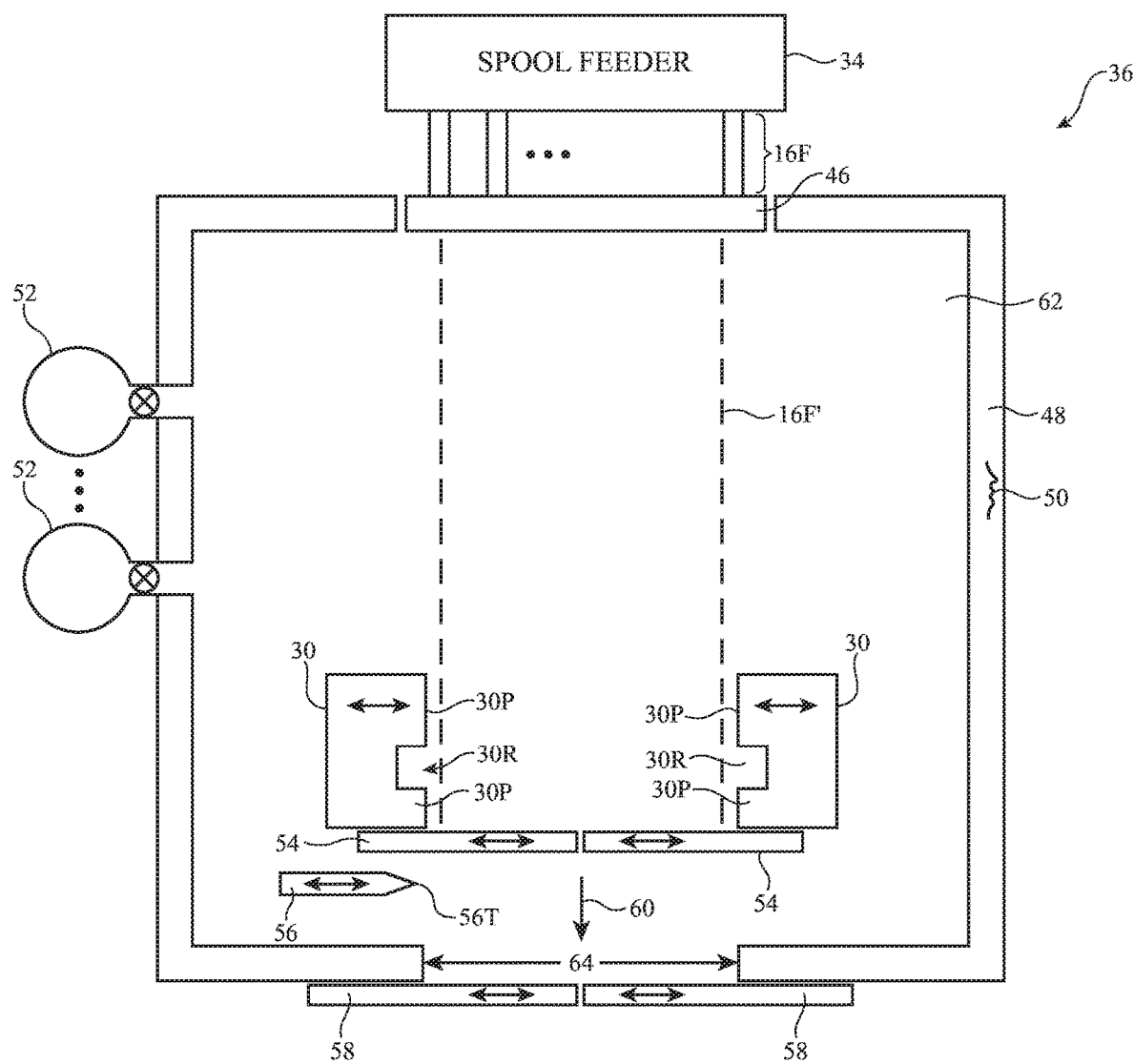
FIG. 6 is a side view of an illustrative heated process chamber in accordance with an embodiment.

FIG. 6 is a diagram of an illustrative process chamber for deforming fibers 16F into a desired shape for fiber optic plates 16. As shown in FIG. 6, computer-controlled spool feeder 34 may supply fibers 16F at a desired feed rate to guide plate 46. Guide plate 46 may be mounted in an opening in walls 48 of process chamber 36. Guide plate 46 may have openings that receive fibers 16F. In an illustrative configuration, guide plate 46 may have at least 100, at least 500, at least 2000, at least 5000, fewer than 100,000, fewer than 25,000, fewer than 10,000, or other suitable number of holes and may be configured to receive at least 1 million, at least 10 million, fewer than 100 million, or other suitable number of fibers. Fibers 16F may be received from spools in spool feeder 34 at the upper side of guide plate 46 and may exit at the lower side of guide plate 46 as loose fiber bundle 16F'.

Gases (e.g., nitrogen, oxygen, etc.) may be selectively introduced into interior 62 of chamber 36 from one or more computer-controlled gas sources 52. Process chamber walls 48 and other portions of chamber 36 may be heated (e.g., using computer-controlled heaters 50). For example, walls 48 and the gasses, fiber structures, and other structures in interior region 62 may be heated to about 150° C. or other suitable temperature sufficient to soften the fibers 16F of fiber bundle 16F' without melting these fibers. Die 30 has computer-controlled positioners that position different die sections. A computer-controlled die arrangement allows die 30 to expand laterally outward to receive fiber bundle 16F' and to be moved laterally inward (towards fiber bundle 16') when it is desired to deform fiber bundle 16F.

During deformation operations, the softened fibers of bundle 16F pass into the area within die 30. When it is desired to deform fibers 16F of bundle 16F' to a desired shape, computer-controlled die gates 54 may be closed and the movable pieces of die 30 may be pushed inwardly against the sides of bundle 16F' by computer-controlled positioners. This indents fiber bundle 16F' where pressed by protruding portions 30P and causes fiber bundle 16F to bulge outwardly where aligned with recess 30R. As a result, an outwardly protruding fiber bundle portion with deformed fibers is created (e.g., a bulge is created that runs around the periphery of the fiber bundle 16F'). Gates 54 may then be opened.

Cutter 56 may have one or more parts with one or more sharp edges 56T for cutting through fiber bundle 16F' within chamber interior 62 (e.g., while fibers 16F are soft). The position of cutter 56 may be adjusted using a computer-controlled positioner. After the fiber bundle has been deformed by die 30, cutter 56 may be moved laterally through the fiber bundle to cut off a layer of the fiber bundle that contains the deformed fibers. This cut off layer forms a rough plate of deformed fibers (e.g., a blank) that can later be machined, polished, and/or otherwise processed by tools 38 into a pair of finished fiber optic plates 16 (see, e.g., dashed lines 16' of FIG. 3).

To ensure that the interior temperature of chamber 36 is maintained at a desired level, chamber 36 may be provided with a computer-controlled chamber gate such as gate 58 (e.g., one or more sliding doors or other structures for sealing chamber wall opening 64). When it is desired to create a sealed chamber (e.g., so that a desired gaseous environment can be maintained in interior 62 and so that the temperature in interior 62 can be maintained as desired), gate 58 may be closed over opening 64. When it is desired to remove a layer of deformed fibers that has been cut from bundle 16F' from interior 62 to the exterior of chamber 36, gate 58 may be opened.

Figure 7:
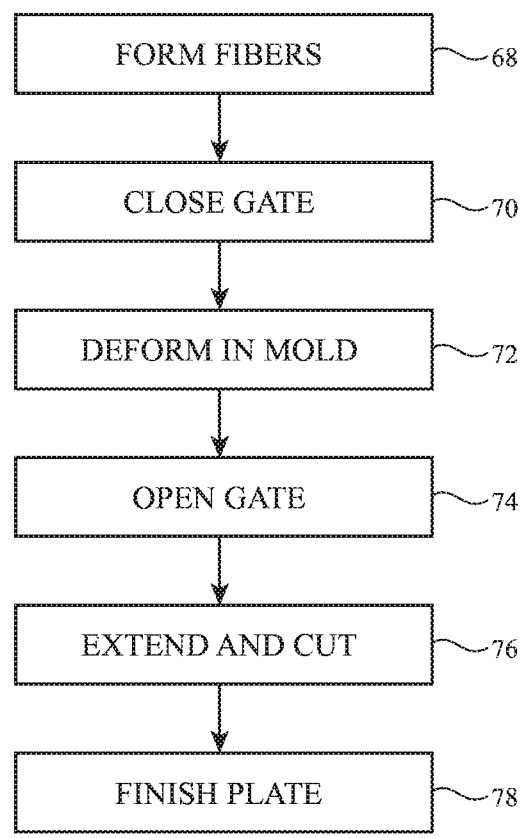
FIG. 7 is a flow chart of illustrative operations involved in forming a fiber optic plate in accordance with an embodiment.

Illustrative steps involved in forming fiber optic plates for device 10 are shown in FIG. 7.

Following formation of fibers 16F (e.g., using extruder 32) and the loading of fiber sources into spool feeder 34 of FIG. 6 at step 68, a loose bundle 16F' of fibers 16F may be formed using guide plate 46 and moved (e.g., lowered) into chamber 36 for processing (e.g., using computer-controlled spools or other computer-controlled fiber bundle positioning equipment associated with spool feeder 34).

During the operations of block 70, chamber gate 58 for chamber 32 may be closed while a desired gaseous environment and temperature are created in interior 62 using gas sources 52 and heater 50. Die gate 54 (which may sometimes be referred to as forming part of die 30) may also be closed.

During the operations of block 72, the computer-controlled mold formed from computer-controlled die 30 is pressed against fibers 16F (e.g., the fibers in loose fiber bundle 16F') to deform fiber bundle 16F' into a desired shape, as shown in FIG. 3. The binder on fibers 16F binds fibers 16F together. The shape of die 30 (e.g., the presence of recess 30R) causes the fiber bundle and its fibers to bulge outwardly into the recess, thereby deforming the fibers as desired. Die gate 54 may be opened after fiber deformation.

During the operations of block 74, chamber gate 58 may be opened. This allows fiber bundle 16F' to be lowered by computer-controlled spool feeder 34 and allows computer-controlled cutter 56 to cut off a layer of fiber bundle 16F' and fiber bundle 16F' for removal from interior 62. The cut-off piece of fiber bundle 16F' forms a plate with deformed fibers suitable for forming one or more (e.g., a pair) of fiber optic plates 16. If desired, the cutter 56 may be used to cut two individual rough fiber plates from the deformed portion of fibers (e.g., cutter 56 may slice between the upper and lower portions of the deformed fibers aligned with recess 30R in the example of FIG. 3 after these deformed fibers exit die 30).

During the operations of block 78, tools 38 may be used to form finished fiber optic plates from the layers of deformed fibers exiting processing chamber 36. Tools 38 may include cutting tools (e.g., saws, etc.) for cutting, machining tools such as grinding tools for grinding the surfaces of a plate of deformed fibers to a desired rough shape (e.g., a shape with rounded peripheral edge profiles as shown in FIG. 1), and polishing tools for polishing the machined surfaces of the fiber optic plates into optically smooth surfaces for use in device 10. After the finished fiber optic plates are produced in this way, additional structures (e.g., display layers, optional additional cover layers such as protective outer layers of glass or other materials, etc.) may be assembled with housings 12 and components 18 to form devices 10).

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. A method of forming a fiber optic plate for an electronic device display cover layer, comprising:
    with computer-controlled fiber bundle positioning equipment, moving a fiber bundle formed from fibers in a heated chamber;
    deforming the fiber bundle by pressing against the fiber bundle in the heated chamber with a die that has a recess so that a portion of the fiber bundle bulges into the recess;
    cutting a layer of deformed fibers from the deformed fiber bundle using a cutter; and
    forming the fiber optic plate from the layer of deformed fibers.

2. The method defined in claim 1 wherein the heated chamber has a guide plate, the method further comprising:
    receiving fibers from the computer-controlled fiber bundle positioning equipment at a first side of the guide plate and providing the fiber bundle to an interior region of the heated chamber at an opposing second side of the guide plate.

3. The method defined in claim 2 further comprising:
    closing a gate over an opening in the heated chamber while the fiber bundle is being deformed.

4. The method defined in claim 3 further comprising:
    after cutting the layer of deformed fibers from the deformed fiber bundle, removing the layer of deformed fibers from the chamber through the opening while the gate is open.

5. The method defined in claim 4, further comprising:
    before moving the fiber bundle formed from the fibers in the heated chamber, extruding the fibers from an extruder.

6. The method defined in claim 5 wherein extruding the fibers from the extruder comprises extruding fibers having a core of a first refractive index, a cladding on the core having a second refractive index that is lower than the first refractive index, and a stray light absorbing layer on the cladding.

7. The method defined in claim 6 wherein extruding the fibers from the extruder further comprises extruding fibers having binder on the stray light absorbing layer.

8. The method defined in claim 7 wherein forming the fiber optic plate from the layer of deformed fibers comprises polishing the layer of deformed fibers using polishing equipment.

9. The method defined in claim 5 wherein extruding the fibers comprises extruding polymer fibers.

10. A method of forming a layer of deformed fibers, comprising:
    extruding fibers from an extruder that each include a transparent core, a transparent cladding, and a binder layer;
    with a guide plate, forming a fiber bundle from the extruded fibers;
    deforming fibers in the fiber bundle within a heated chamber by pressing against the fiber bundle with a die; and
    cutting off the layer of the deformed fibers with a cutter.

11. The method defined in claim 10 wherein the die has a recess and wherein deforming the fibers comprises pressing against the fiber bundle with the die to cause the fibers of the fiber bundle to bulge into the recess.

12. The method defined in claim 11 wherein extruding the fibers comprises extruding a stray light absorbing layer between the transparent cladding and the binder layer.

13. The method defined in claim 11 wherein the guide plate is coupled to the heated chamber and separates an interior region in the chamber from an exterior region and wherein extruding the fibers comprises extruding polymer.

14. The method defined in claim 13 wherein the chamber has an opening and a gate, the method further comprising:
    closing the gate to cover the opening while deforming the fibers with the die in the interior region.

15. The method defined in claim 14 further comprising:
    opening the gate to uncover the opening; and
    removing the cut off layer of the deformed fibers from the heated chamber through the opening.

16. The method defined in claim 15 further comprising:
    machining the cut off layer of the deformed fibers to form a surface with a curved edge profile; and
    polishing the surface to form a polished fiber optic plate.

17. A method of forming a fiber optic plate, comprising:
    forming fibers that each include a core, a cladding, a stray light absorbing layer, and binder;
    forming a fiber bundle by passing the fibers through a guide plate into an interior region of a heated chamber;
    deforming the fibers by applying pressure to the fiber bundle with a mold;
    opening a gate over an opening in the heated chamber;
    removing the deformed fibers through the opening; and
    using the deformed fibers to form the fiber optic plate.

18. The method defined in claim 17 further comprising:
using a cutter to cut off a layer of the deformed fibers within the interior region, wherein removing the deformed fibers comprises removing the cut off layer of the deformed fibers.

19. The method defined in claim 17 wherein forming the fibers comprises forming the fibers from polymer materials.

20. The method defined in claim 17 wherein the mold comprises a computer-controlled mold with a recess and wherein deforming the fibers comprises pressing inwardly against the fiber bundle with the computer-controlled mold to cause the fibers to bulge into the recess.

21. The method defined in claim 17 wherein forming the fibers comprises extruding the fibers using an extruder and passing the extruded fibers through corresponding holes in multiple parallel guide plates.

* * * * *